United States Patent [19]

Hitomi et al.

[11] Patent Number: 5,133,308
[45] Date of Patent: Jul. 28, 1992

[54] INTAKE SYSTEM FOR ENGINE

[75] Inventors: Mitsuo Hitomi; Toshihiko Hattori; Mikihito Fujii, all of Hiroshima, Japan

[73] Assignee: Mazda Motor Corporation, Hiroshima, Japan

[21] Appl. No.: 705,922

[22] Filed: May 28, 1991

[30] Foreign Application Priority Data

May 28, 1990 [JP] Japan .................. 2-139075

[51] Int. Cl.⁵ .............................. F02M 35/10
[52] U.S. Cl. ............................. 123/52 MB
[58] Field of Search ......... 123/52 M, 52 MV, 52 MB, 123/52 MC, 52 MF, 52 ML

[56] References Cited

U.S. PATENT DOCUMENTS 4,932,378 6/1990 Hitomi et al. .............. 123/432
4,977,865 12/1990 Hiraoka et al. ............. 123/52 MB

FOREIGN PATENT DOCUMENTS

0137516 10/1979 Japan ............... 123/52 MB
0088862 5/1985 Japan ............... 123/52 MB
2136501 9/1984 United Kingdom ...... 123/52 MB

Primary Examiner—David A. Okonsky
Attorney, Agent, or Firm—Sixbey, Friedman, Leedom & Ferguson

[57] ABSTRACT

An engine has a plurality of cylinders and the cylinders are divided into first and second cylinder groups so that the cylinders in each cylinder group do not fire one after another. An intake system for the engine has a plurality of discrete intake passages extending from the respective cylinders of the engine and merge into a junction chamber, a common intake passage which opens to the atmosphere at its upstream end and communicates with the junction chamber at its downstream end, a first communicating passage which is connected to the discrete intake passages for the first cylinder group at their intermediate portions and communicates them with each other, and a second communicating passage which is connected to the discrete intake passages for the second cylinder group at their intermeidate portions and communicates them with each other.

5 Claims, 9 Drawing Sheets

INTAKE SYSTEM FOR ENGINE

BACKGROUND OF THE INVENTION

1. Field of the Invention

This invention relates to an intake system for an engine, and more particularly to an intake system for an engine which is arranged to supercharge the engine by the kinetic effect of intake air.

2. Description of the Prior Art

Various multiple-cylinder engines are known which are arranged to increase the charging efficiency, and thereby the engine output torque, by the kinetic effect of intake air such as an inertia effect or a resonance effect of intake air. For example, in the multiple-cylinder engine disclosed in Japanese Unexamined Patent Publication No. 62(1987)-121828, the cylinders are divided into two groups so that the cylinders in each group do not fire one after another, discrete passages for the cylinders in each group are connected to an enlarged volume chamber, the enlarged volume chambers for the respective cylinder groups are connected to the downstream ends of a pair of long resonance passages which are connected to each other at their upstream ends, and the enlarged volume chambers are connected by a short resonance passage which is provided with an on-off valve.

In such an engine, supercharging effect by the kinetic effect of intake air can be obtained over a wide engine speed range by opening and closing the on-off valve according to the operating condition of the engine. For example, when the on-off valve is closed in a low engine speed range, an air column between the intake port for each cylinder and the upstream end of the long resonance passage is oscillated by a negative pressure wave generated in the intake stroke of the cylinder and when the engine speed tunes to the natural frequency of the air column, the amplitude of the oscillation of the air column is maximized and a resonance supercharging effect is obtained, whereby the charging efficiency is increased. When the on-off valve is opened in a high engine speed range, an air column between the intake port for each cylinder and the enlarged volume chamber for the other cylinder group with which the cylinder is communicated by way of the short resonance passage is oscillated by said negative pressure wave and when the engine speed tunes to the natural frequency of the air column, the amplitude of the oscillation of the air column is maximized and another resonance supercharging effect is obtained, whereby the charging efficiency is increased. When the engine speed increases further higher, a negative pressure generated at the beginning of the intake stroke of each cylinder is reflected as a positive pressure wave at the enlarged volume chamber and propagates downstream and acts on the same cylinder at the end of the intake stroke to supercharge the cylinder by an inertia effect of the intake air. The inertia supercharging effect is maximized at a particular engine speed which is determined mainly according to each discrete passage.

However, the engine is disadvantageous in that the surge tanks add to the overall size of the intake system. Especially in the case of a V-type engine, the surge tanks must be disposed above the cylinder banks, and accordingly, the height of the engine increases. On the other hand, when the surge tanks are eliminated, the inertia supercharging effect deteriorates and the engine output power cannot be increased especially in the high engine speed range.

When an engine can be supercharged by the resonance effect of intake air, which needs no surge tank, at the high engine speed range, the overall size of the engine can be reduced. For such a purpose, an intake system shown in FIG. 9 can be conceived.

Figure 9:
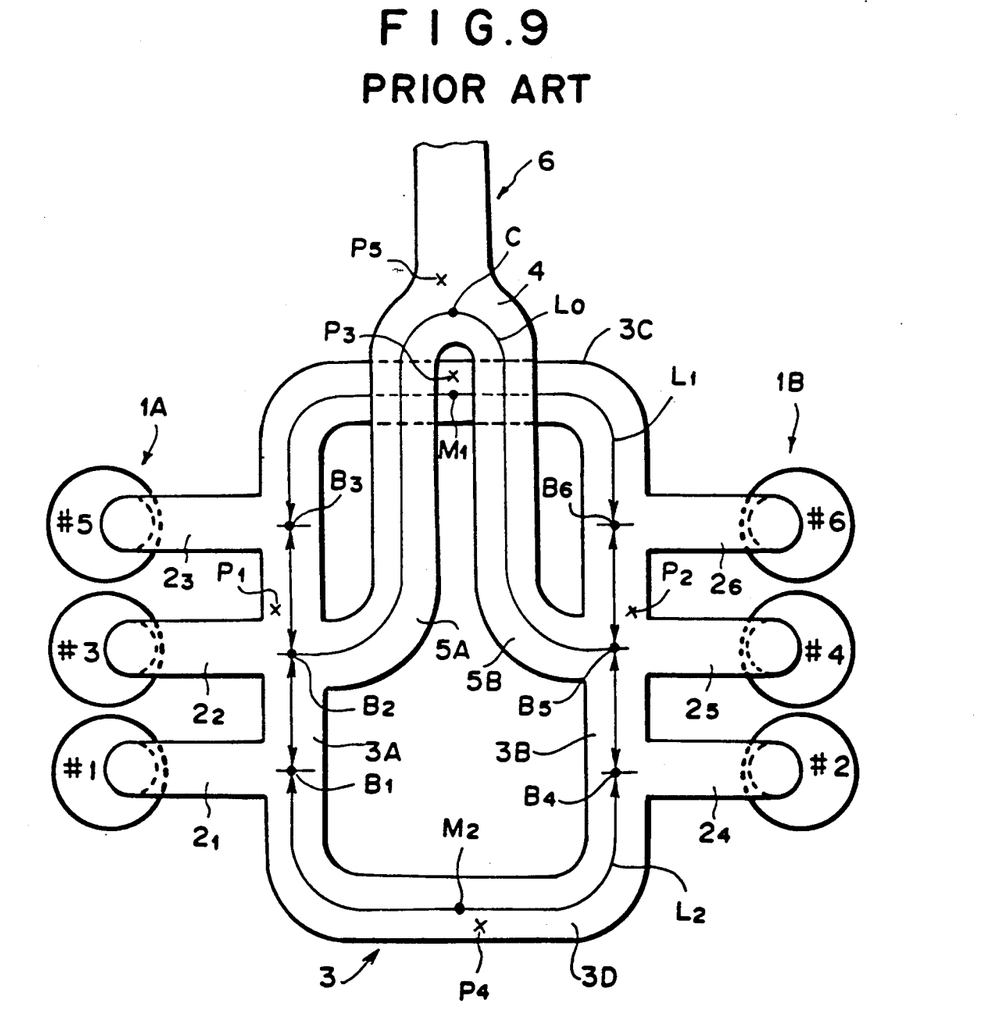
FIG. 9 is a schematic view showing an intake system according to a prior art.

The intake system shown in FIG. 9 is for a V-6 engine which has first to sixth cylinders #1 to #6. The first, third and fifth cylinders #1, #3 and #5 are formed in a row in first cylinder bank 1A and the second, fourth and sixth cylinders #2, #4 and #6 are formed in a row in a second cylinder bank 1B. The firing order is 1-6-3-4-5-', and accordingly, the cylinders in each cylinder bank do not fire one after another.

The first, third and fifth cylinders #1, #3 and #5 in the first cylinder bank 1A are communicated with a first communicating passage 3A respectively by way of first to third discrete intake passages $2_1$, $2_2$ and $2_3$, and the second, fourth and sixth cylinders #2, #4 and #6 in the second cylinder bank 1B are communicated with a second communicating passage 3B respectively by way of fourth to sixth discrete intake passages $2_4$, $2_5$ and $2_6$. The first communicating passage 3A extends substantially in parallel to the cylinder row in the first cylinder bank 1A, and the second communicating passage 3B extends substantially in parallel to the cylinder row in the second cylinder bank 1B. A main intake passage 6 branches at a junction 4 into first and second branch intake passages 5A and 5B which are substantially equal to each other in length. The downstream end of the first branch intake passage 5A is connected to the first communicating passage 3A at a portion opposed to the junction of the second discrete intake passage $2_2$ to the first communicating passage 3A, and the downstream end of the second branch intake passage 5B is connected to the second communicating passage 3B at a portion opposed to the junction of the fifth discrete intake passage $2_5$ to the second communicating passage 3B.

First and second inter-cylinder-bank communicating passages 3C and 3D connect the upper ends (as seen in FIG. 9) of the first and second communicating passages 3A and 3B and the lower ends (as seen in FIG. 9) of the same, thereby forming a circular passage 3.

Generally, in the case of the resonance supercharging effect, the tuning engine speed at which the charging efficiency is maximized mainly depends on the mean cross-sectional area and the length of the part of the passage upstream of the portion at which the discrete intake passages in each cylinder bank communicate with each other. Accordingly, in the case of the intake system shown in FIG. 9, the circular passage 3 serves as a part of the passage upstream of the portion at which the discrete intake passages in each cylinder bank communicate with each other and the cross-sectional area of the upstream side portion increases, whereby resonance tuning engine speed becomes higher. Thus, the engine output power in the high engine speed range can be increased by the resonance supercharging effect.

However the intake system shown in FIG. 9 is disadvantageous in that since the first branch intake passage 5A opens to the first communicating passage 3A at a portion opposed to the second discrete intake passage $2_2$ and the second branch intake passage 5B opens to the second communicating passage 3B at a portion opposed to the fifth discrete intake passage $2_5$, intake air smoothly flows into the second and fifth discrete intake passages $2_2$ and $2_5$ but the passages through which intake air flows into the other discrete intake passages have crooks and intake air cannot smoothly flow into the other discrete intake passages. Accordingly, especially in the high engine range where the flow of intake is high, intake air cannot be uniformly distributed to all the cylinders and the charging amount of intake air varies from cylinder to cylinder.

SUMMARY OF THE INVENTION

In view of the foregoing observations and description, the primary object of the present invention is to provide an intake system for a multiple-cylinder engine which can supercharge the engine by a resonance effect of intake air in a high engine speed range and in which intake air can be uniformly distributed to all the cylinders.

In accordance with the present invention, there is provided an intake system for an engine having a plurality of cylinders which are divided into first and second cylinder groups so that the cylinders in each cylinder group do not fire one after another, said intake system comprising a plurality of discrete intake passages extending from the respective cylinders of the engine and merge into a junction chamber, a common intake passage which opens to the atmosphere at its upstream end and communicates with the junction chamber at its downstream end, a first communicating passage which is connected to the discrete intake passages for the first cylinder group at their intermediate portions and communicates them with each other, and a second communicating passage which is connected to the discrete intake passages for the second cylinder group at their intermediate portions and communicates them with each other.

The first and second communicating passages form a circular passage together with a part of the discrete intake passages and the resonance tuning engine speed is shifted toward the higher engine speed by virtue of the circular passage. Further since all the discrete intake passages directly branch off from the junction chamber which communicates with the common intake passage, intake air is more uniformly distributed to the cylinders and the flow resistance of intake air is reduced whereby the air charging efficiency in the high engine speed range is improved.

DESCRIPTION OF THE PREFERRED EMBODIMENTS

Figure 1:
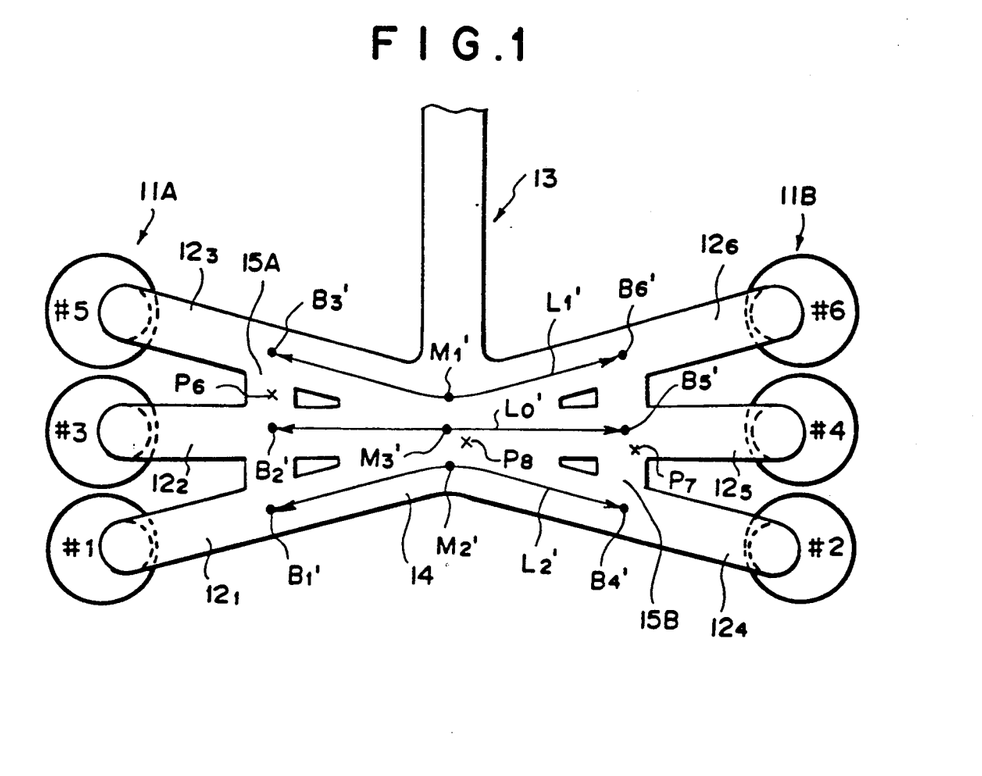
FIG. 1 is a schematic view showing an intake system in accordance with an embodiment of the present invention.

In FIG. 1, a V-6 engine has first to sixth cylinders #1 to #6. The first, third and fifth cylinders #1, #3 and #5 are formed in a row in first cylinder bank 11A and the second, fourth and sixth cylinders #2, #4 and #6 are formed in a row in a second cylinder bank 11B. The firing order is 1-6-3-4-5-2, and accordingly, the cylinders in each cylinder bank do not fire one after another.

First to sixth discrete intake passages $12_1$ to $12_6$ radially branches off from a junction chamber 14 formed at the downstream end of a common intake passage 13. The first to third discrete intake passages $12_1$ to $12_3$ extend substantially linearly and are respectively connected to the first, third and fifth cylinders #1, #3 and #5 in the first cylinder bank 11A, and the fourth to sixth discrete intake passages $12_4$ to $12_6$ extend substantially linearly and are respectively connected to the second, fourth and sixth cylinders #2, #4 and #6 in the second cylinder bank 11B.

A first communicating passage 15A extends substantially in parallel to the cylinder row in the first cylinder bank 11A and is connected to intermediate portions of the first to third discrete intake passages $12_1$ and $12_3$ to communicate the first to third discrete intake passages $12_1$ to $12_3$ with each other. Similarly a second communicating passage 15B extends substantially in parallel to the cylinder row in the second cylinder bank 11B and is connected to intermediate portions of the fourth to sixth discrete intake passages $12_4$ and $12_6$ to communicate the fourth to sixth discrete intake passages $12_4$ to $12_6$ with each other.

In this embodiment, the effective passage length L1' between the junction B3' of the third discrete intake passage $12_3$ to the first communicating passage 15A and the junction B6' of the sixth discrete intake passage $12_6$ to the second communicating passage 15B is substantially equal to the effective passage length L1 (FIG. 9) between the junction B3 of the third discrete intake passage $2_3$ to the first communicating passage 3A and the junction B6 of the sixth discrete intake passage $2_6$ to the second communicating passage 3B in the intake system shown in FIG. 9. The midpoint M1' of the effective passage length L1' is positioned in the junction chamber 14. Further the effective passage length L2' between the junction B1' of the first discrete intake passage $12_1$ to the first communicating passage 15A and the junction B4' of the fourth discrete intake passage $12_4$ to the second communicating passage 15B is substantially equal to the effective passage length L2 (FIG. 9) between the junction B1 of the first discrete intake passage $2_1$ to the first communicating passage 3A and the junction B4 of the fourth discrete intake passage $2_4$ to the second communicating passage 3B in the intake system shown in FIG. 9. The midpoint M2' of the effective passage length L2' is positioned in the junction chamber 14.

Thus in this embodiment, the upstream side portions of the first and fourth discrete intake passages $12_1$ and $12_4$ which communicate with each other through the junction chamber 14, the first and second communicating passages 15A and 15B and the upstream side portions of the third and sixth discrete intake passages $12_3$ and $12_6$ which communicate with each other through the junction chamber 14 form a circular passage equivalent to the circular passage 3 in the intake system shown in FIG. 9.

Further the effective passage length Lo' between the junction B2' of the second discrete intake passage $12_2$ to the first communicating passage 15A and the junction B5' of the fifth discrete intake passage $12_5$ to the second communicating passage 15B is substantially equal to the effective passage length Lo of the passage joining the junction B1 of the second discrete intake passage $2_1$ to the first communicating passage 3A to the junction B5 of the fifth discrete intake passage $2_5$ to the second communicating passage 3B via the first and second branch intake passages 5A and 5B in the intake system shown in FIG. 9. The midpoint M3' of the effective passage length L2' is positioned in the junction chamber 14.

The lengths of the parts of the discrete intake passages $12_1$ to $12_6$ downstream of the first communicating passage 15A or the second communicating passage 15B are substantially equal to each other and are set so that an inertia supercharging effect is obtained at an engine speed higher than the allowable maximum engine speed.

Figure 10:
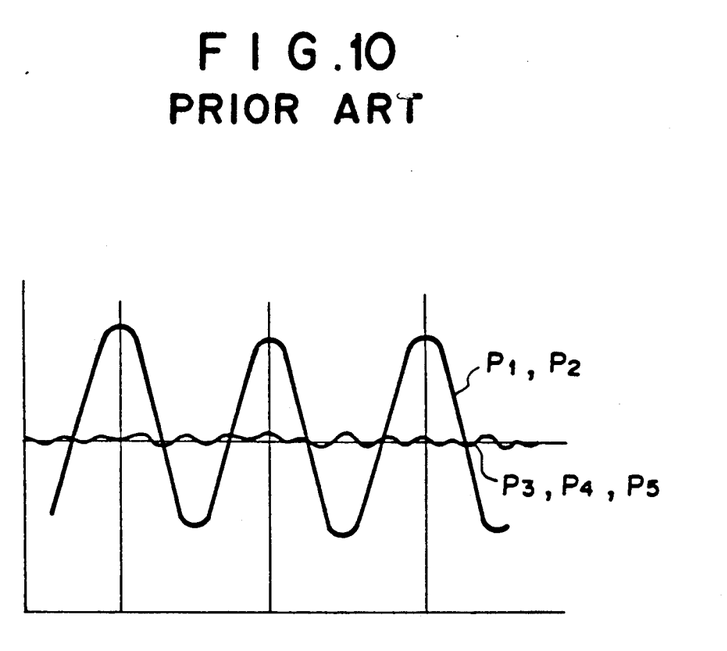
FIG. 10 is a view showing pressure oscillations at several points in the intake system shown in FIG. 9 at the resonance tuning engine speed.

In the intake system shown in FIG. 9, the pressure changes at a point P1 near the junction B2, a point P2 near the junction B5, a point P3 near the midpoint M1 of the effective passage length L1, a point P4 near the midpoint M2 of the effective passage length L2 and a point P5 near the midpoint C of the effective passage length Lo were measured at the resonance tuning engine speed. As shown in FIG. 10, the pressure at the points P1 and P2 periodically changed with a large amplitude and the pressure at the points P3, P4 and P5 hardly changed. This fact indicates that a resonance having nodes of pressure oscillation near the midpoints M1 and M2 is produced in the circular passage 3.

Figure 2:
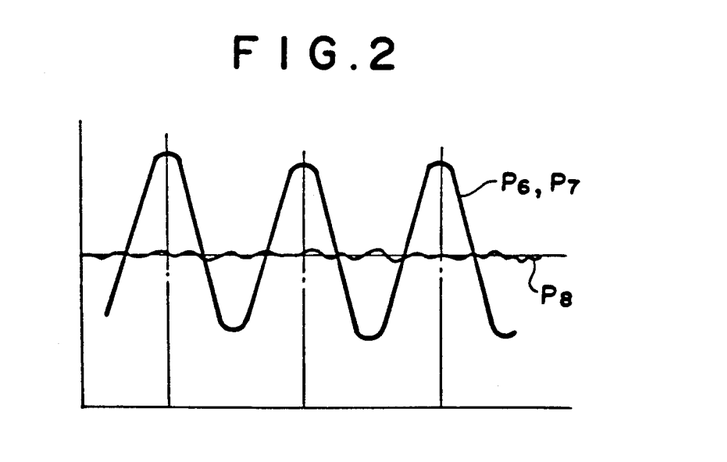
FIG. 2 is a view showing pressure oscillations at several points in the intake system shown in FIG. 1 at the resonance tuning engine speed.

On the other hand, when the pressure changes at a point P6 near the junction B2', a point P7 near the junction B5' and a point P8 near the center of the junction chamber 14 in the intake system shown in FIG. 1 were measured at the resonance tuning engine speed, the pressure at the points P6 and P7 periodically changed with a large amplitude and the pressure at the point P8 hardly changed as shown in FIG. 2. This indicates that the intake system shown in FIG. 1 is substantially equivalent to that shown in FIG. 9 with respect to the resonance effect of intake air.

However in the case of the intake system of this embodiment shown in FIG. 1, all the discrete intake passages $12_1$ to $12_6$ directly branch off from the junction chamber 14 which communicates with the common intake passage 13, and accordingly, intake air is more uniformly distributed to the cylinders and the flow resistance of intake air is reduced whereby the air charging efficiency in the high engine speed range is improved.

Figure 3:
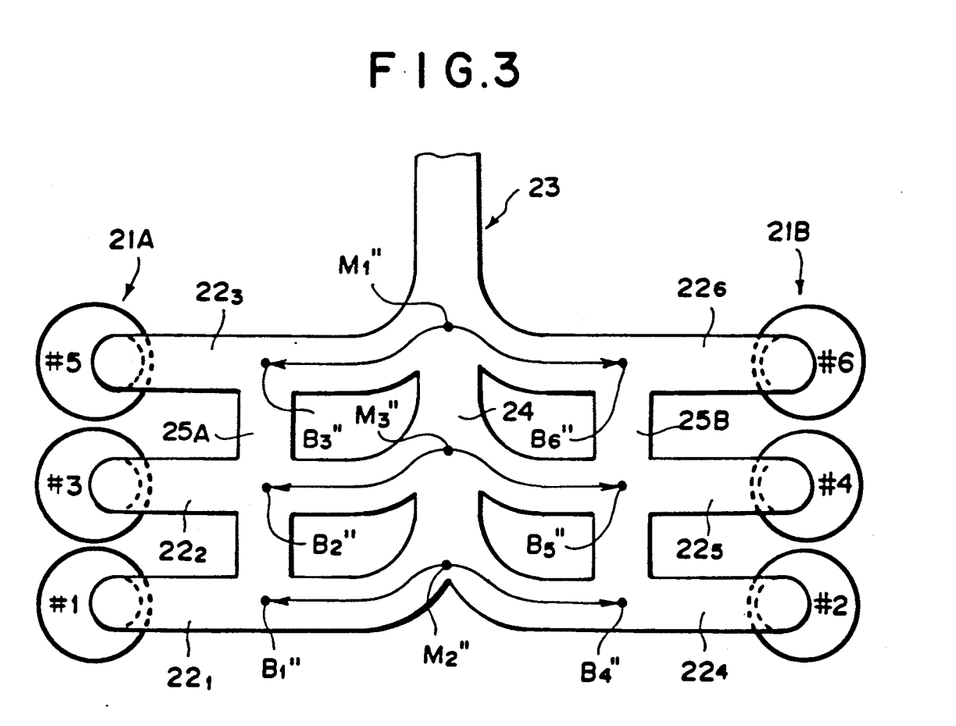
FIG. 3 is a schematic view showing an intake system in accordance with another embodiment of the present invention.

FIG. 3 shows another embodiment of the present invention.

In FIG. 3, a V-6 engine has first to sixth cylinders #1 to #6. The first, third and fifth cylinders #1, #3 and #5 are formed in a row in first cylinder bank 21A and the second, fourth and sixth cylinders #2, #4 and #6 are formed in a row in a second cylinder bank 21B. The firing order is 1-6-3-4-5-2, and accordingly, the cylinders in each cylinder bank do not fire one after another.

First to sixth discrete intake passages $22_1$ to $22_6$ branches off from a junction chamber 24 which is formed at the downstream end of a common intake passage 23 and linearly extends substantially in parallel to the cylinder rows. The first to third discrete intake passages $22_1$ to $22_3$ extend substantially linearly and are respectively connected to the first, third and fifth cylinders #1, #3 and #5 in the first cylinder bank 21A, and the fourth to sixth discrete intake passages $22_4$ to $22_6$ extend substantially linearly and are respectively connected to the second, fourth and sixth cylinders #2, #4 and #6 in the second cylinder bank 21B.

A first communicating passage 25A extends substantially in parallel to the cylinder row in the first cylinder bank 21A and is connected to intermediate portions of the first to third discrete intake passages $22_1$ and $22_3$ to communicate the first to third discrete intake passages $22_1$ to $22_3$ with each other. Similarly a second communicating passage 25B extends substantially in parallel to the cylinder row in the second cylinder bank 21B and is connected to intermediate portions of the fourth to sixth discrete intake passages $22_4$ and $22_6$ to communicate the fourth to sixth discrete intake passages $22_4$ to $22_6$ with each other.

In this embodiment, the effective passage length L1" between the junction B3" of the third discrete intake passage $22_3$ to the first communicating passage 25A and the junction B6" of the sixth discrete intake passage $22_6$ to the second communicating passage 25B is substantially equal to the effective passage length L1' in the intake system shown in FIG. 1. The midpoint M1' of the effective passage length L1" is positioned in the junction chamber 24. Further the effective passage length L2" between the junction B1' of the first discrete intake passage $22_1$ to the first communicating passage 25A and the junction B4' of the fourth discrete intake passage $22_4$ to the second communicating passage 25B is substantially equal to the effective passage length L2' in the intake system shown in FIG. 1. The midpoint M2" of the effective passage length L2" is positioned in the junction chamber 24. Further the effective passage length Lo" between the junction B2" of the second discrete intake passage $22_2$ to the first communicating passage 25A and the junction B5" of the fifth discrete intake passage $22_5$ to the second communicating passage 25B is substantially equal to the effective passage length Lo' in the intake system shown in FIG. 1. The midpoint M3" of the effective passage length L2" is positioned in the junction chamber 24.

The lengths of the parts of the discrete intake passages $22_1$ to $22_6$ downstream of the first communicating passage 25A or the second communicating passage 25B are substantially equal to each other and are set so that an inertia supercharging effect is obtained at an engine speed higher than the allowable maximum engine speed.

Also the intake system of this embodiment is substantially equivalent to that shown in FIG. 9 with respect to the resonance effect of intake air. Further, also in this embodiment, all of the discrete intake passages $22_1$ to $22_6$ directly branch off from the junction chamber 24 which communicates with the common intake passage 23, and accordingly, intake air is more uniformly distributed to the cylinders and the flow resistance of intake air is reduced whereby the air charging efficiency in the high engine speed range is improved.

Figure 4:
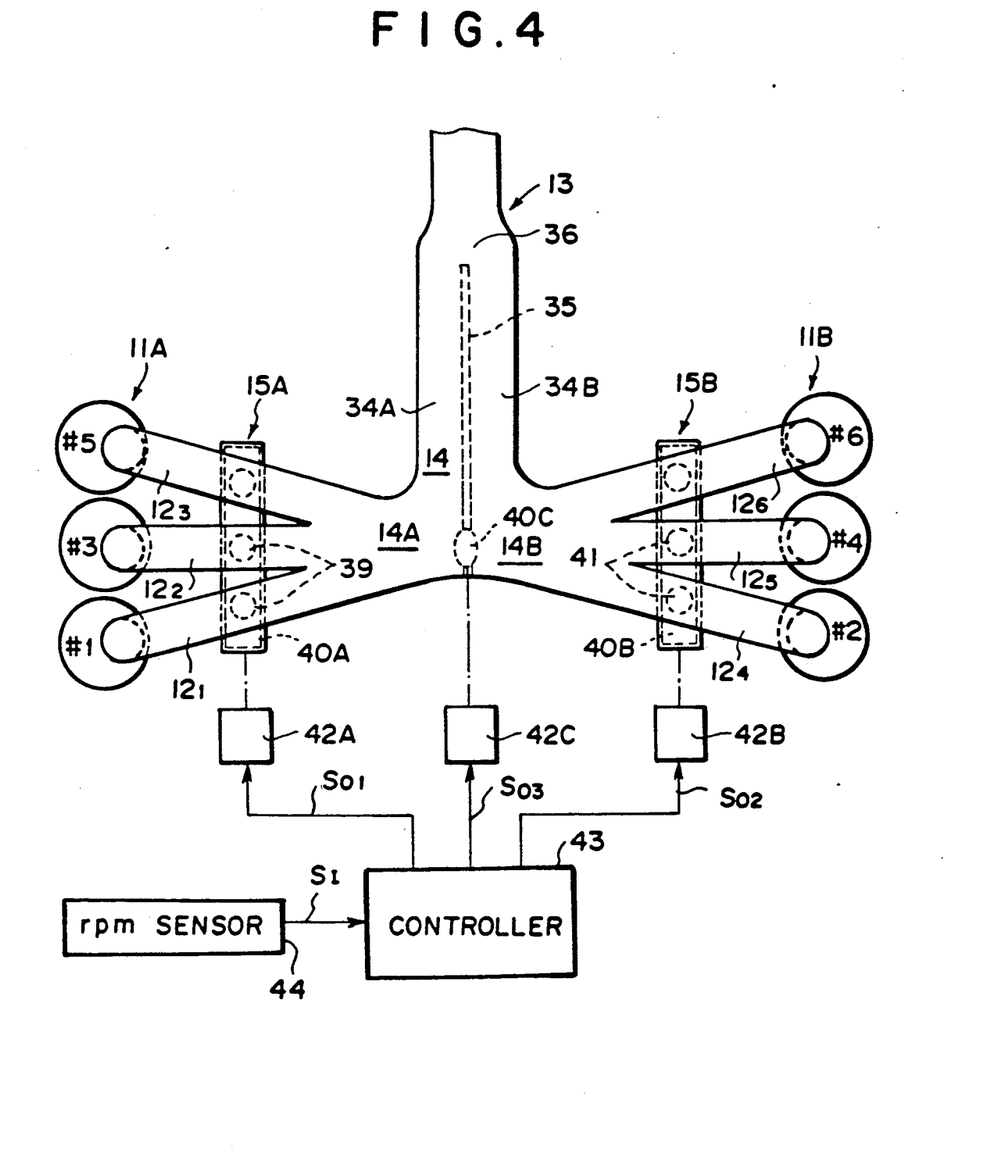
FIG. 4 is a schematic view showing an intake system in accordance with still another embodiment of the present invention.

FIG. 4 shows an intake system in accordance with still another embodiment of the present invention. This intake system is very similar to that shown in FIG. 1, and accordingly, the elements analogous to those shown in FIG. 1 are given the same reference numerals and will not be described here.

In this embodiment, a partition 35 extends from the bottom of the junction chamber 14 into the common intake passage 13, whereby the junction chamber 14 is divided into first and second junction chambers 14A and 14B and first and second resonance passages 34A and 34B are formed. The first and second resonance passages 34A and 34B communicate with each other at the upstream ends. The first to third discrete intake passages $12_1$ to $12_3$ communicate with the first junction chamber 14A and the fourth to sixth discrete intake passages $12_4$ to $12_6$ communicate with the second junction chamber 14B.

The first communicating passage 15A communicates with the discrete intake passages $12_1$ to $12_3$ by way of openings 39 and is provided with a first on-off valve 40A in the form of a rotary valve which opens and closes the openings 39. Similarly the second communicating passage 15B communicates with the discrete intake passages $12_4$ to $12_6$ by way of openings 41 and is provided with a second on-off valve 40B in the form of a rotary valve which opens and closes the openings 41. The partition 35 is provided with an opening which communicates the first and second junction chambers 14A and 14B and a third on-off valve 40C in the form of a butterfly valve is provided in the opening to open and close it.

The valves 40A to 40C are driven by actuators 42A to 42C under the control of a controller 43. An engine speed signal S1 is input into the controller 43 from an engine speed sensor 44, and the controller 43 outputs control signals So1, So2 and So3 to the actuators 42A to 42C to close all the valves 40A to 40C when the engine speed is in a low engine speed range lower than a first preset engine speed N1, to open all the valves 40A to 40C when the engine speed is in a high engine speed range higher than a second preset engine speed N2, and to close the first and second on-off valves 40A and 40B and open the third on-off valve 40C when the engine speed is in a middle engine range between the first and second preset engine speeds N1 and N2.

Figure 5:
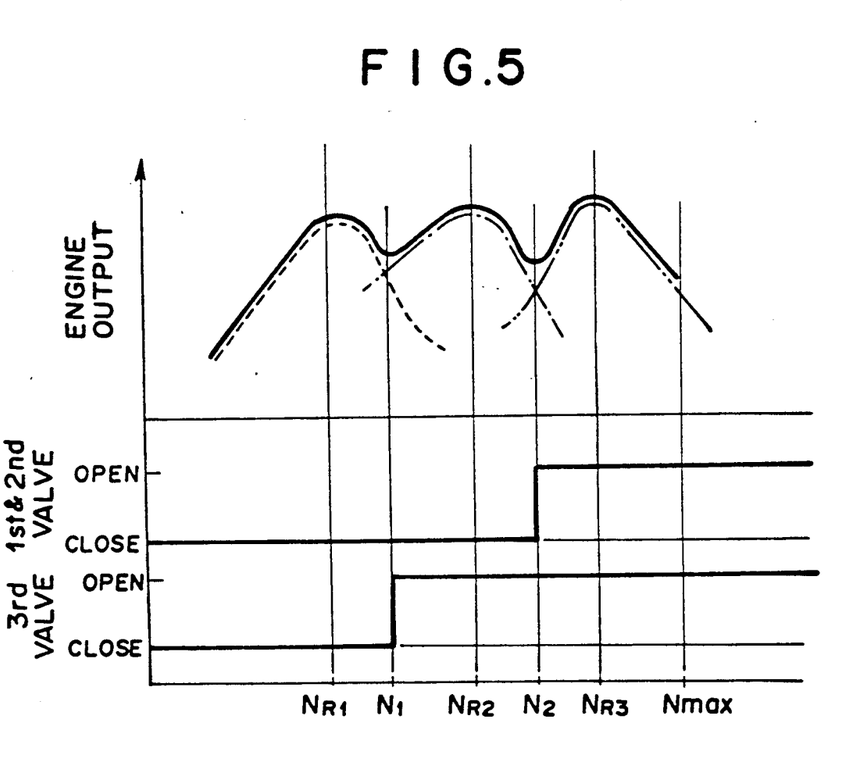
FIG. 5 is a view showing an engine output characteristic curve of an engine provided with the intake system shown in FIG. 4.

In the low engine speed range where the engine speed is lower than the predetermined engine speed N1, the first on-off valve 40A breaks the communication between the first to third discrete intake passages $12_1$ to $12_3$ and the second on-off valve 40B breaks the communication between the fourth to sixth discrete intake passages $12_4$ to $12_6$ and the third on-off valve 40C breaks the communication between the first and second junction chambers 14A and 14B as described above. Accordingly, in the low engine speed range, an air column which opens to the atmosphere at the junction 36 of the first and second resonance passages 34A and 34B is caused to oscillate at a relatively long wavelength and the amplitude of the air column oscillation is maximized at an engine speed NR1 which tunes to the natural frequency of the air column oscillation, whereby a first peak is produced in the engine output characteristic curve near the engine speed $N_{R1}$ by a resonance supercharging effect as shown in FIG. 5.

When the engine speed exceeds the predetermined engine speed N1, the third on-off valve 40C opens and the first and second junction chambers 14A and 14B communicate with each other. At this time, an air column in each of the first and second junction chambers 14A and 14B and the discrete intake passages connected thereto which opens to the atmosphere at the other junction chamber is caused to oscillate at a shorter wavelength. The amplitude of the air column oscillation is maximized at an engine speed NR2 which tunes to the natural frequency of the air column oscillation, and a second peak is produced in the engine output characteristic curve near the engine speed $N_{R2}$ by another resonance supercharging effect as shown in FIG. 5.

When the engine speed further increases and exceeds the second preset engine speed N2, all the on-off valves 40A to 40C open, whereby the first to third discrete intake passages $12_1$ to $12_3$ communicates with each other by way of the first communicating passage 15A, the fourth to fifth discrete intake passages $12_4$ to $12_6$ communicate with each other, and the first and second junction chambers 14A and 14B communicate with each other. At this time, the upstream side portions of the first and fourth discrete intake passages 121 and 124, the first and second communicating passages 15A and 15B and the upstream side portions of the third and sixth discrete intake passages $12_3$ and $12_6$ form a circular passage equivalent to the circular passage in the intake system shown in FIG. 1. Accordingly, a resonance to which the engine speed tunes at an engine speed NR3 between the second preset engine speed Ne and the allowable maximum engine speed Nmax is generated, and a third peak is produced in the engine output characteristic curve near the engine speed $N_{R3}$ by another resonance supercharging effect as shown in FIG. 5.

In he embodiment shown in FIG. 4, the engine output performance can be improved for a wide engine speed range by opening and closing the on-off valves 40A to 40C according to the engine speed.

Figure 6:
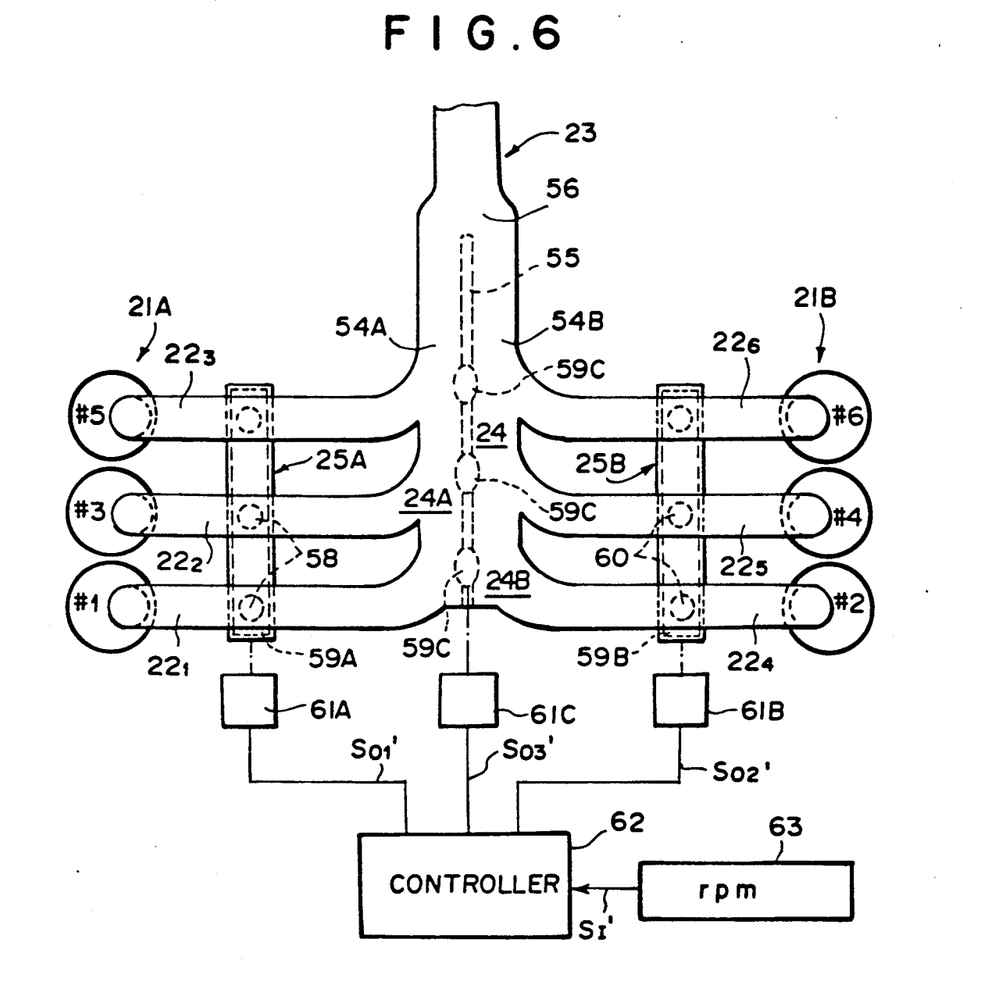
FIG. 6 is a schematic view showing an intake system in accordance with still another embodiment of the present invention.

FIG. 6 shows an intake system in accordance with still another embodiment of the present invention. This intake system is very similar to that shown in FIG. 3, and accordingly, the elements analogous to those shown in FIG. 3 are given the same reference numerals and will not be described here.

In this embodiment, a partition 55 extends from the bottom of the junction chamber 24 into the common intake passage 23, whereby the junction chamber 24 is divided into first and second junction chambers 24A and 24B and first and second resonance passages 54A and 54B are formed. The first and second resonance passages 54A and 54B communicate with each other at the upstream ends. The first to third discrete intake passages $22_1$ to $22_3$ communicate with the first junction chamber 24A and the fourth to sixth discrete intake passages $22_4$ to $22_6$ communicate with the second junction chamber 24B.

The first communicating passage 25A communicates with the discrete intake passages $22_1$ to $22_3$ by way of openings 58 and is provided with a first on-off valve 59A in the form of a rotary valve which opens and closes the openings 58. Similarly the second communicating passage 25B communicates with the discrete intake passages $22_4$ to $22_6$ by way of openings 60 and is provided with a second on-off valve 59B in the form of a rotary valve which opens and closes the openings 60. The partition 55 is provided with three openings which communicates the first and second junction chambers 24A and 24B at positions corresponding to the midpoints M1" to M3" and third on-off valves 59C in the form of a butterfly valve are provided in the openings to open and close them.

The valves 59A to 59C are driven by actuators 61A to 61C under the control of a controller 62. An engine speed signal S1' is input into the controller 62 from an engine speed sensor 63, and the controller 62 outputs control signals So1', So2' and So3' to the actuators 61A to 61C to close all the valves 59A to 59C when the engine speed is in the low engine speed range lower than the first preset engine speed N1, to open all the valves 59A to 59C when the engine speed is in the high engine speed range higher than the second preset engine speed N2, and to close the first and second on-off valves 59A and 59B and open the third on-off valves 59C when the engine speed is in the middle engine range between the first and second preset engine speeds N1 and N2.

In the high engine speed range where all the on-off valves 59A to 59C open, the upstream side portions of the first and fourth discrete intake passages $22_1$ and $22_4$, the first and second communicating passages 25A and 25B and the upstream side portions of the third and sixth discrete intake passages $22_3$ and $22_6$ form a circular passage equivalent to the circular passage in the intake system shown in FIG. 2, whereby the engine speed at which a resonance supercharging effect is obtained shifts toward the higher engine speed side.

Figure 7:
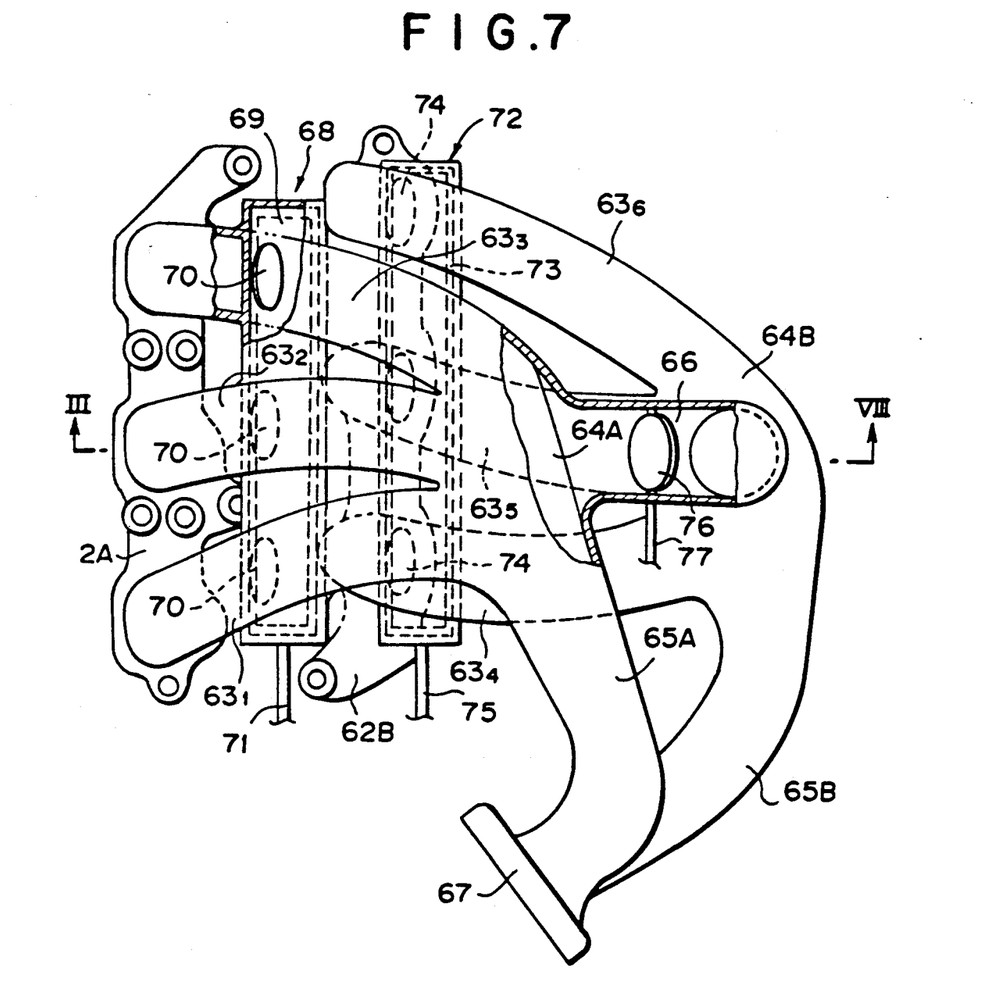
FIG. 7 is a plan view partly in cross-section of an example of a concrete structure of the intake system shown in FIG. 4.
Figure 8:
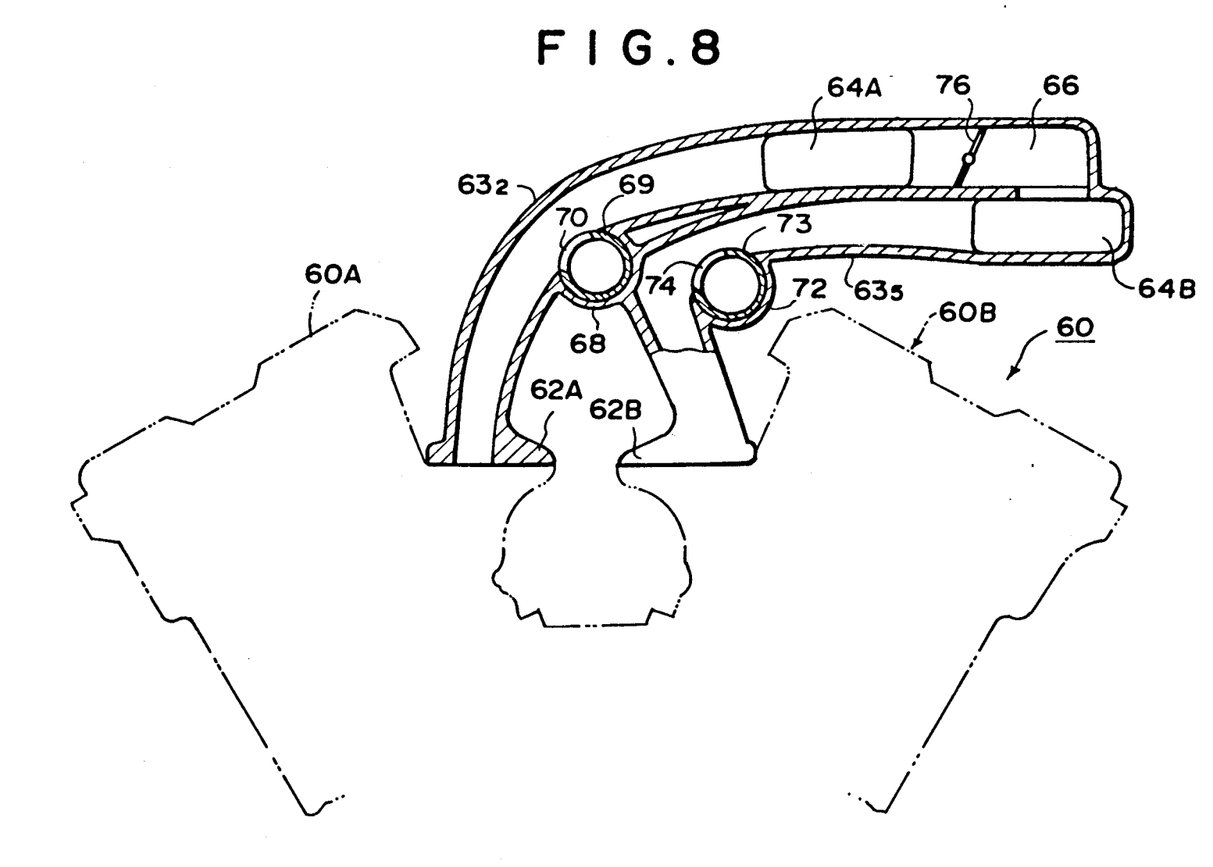
FIG. 8 is a cross-sectional view taken along line VIII—VIII in FIG. 7.

FIGS. 7 and 8 show an example of a concrete structure of the intake system shown in FIG. 4.

In FIGS. 7 and 8, an engine 60 has first and second cylinder banks 60A and 60B and an intake manifold 61 of the engine 60 has first and second flange portions 62A and 62B which are connected to cylinder heads formed in the respective cylinder banks 60A and 60B. The intake manifold 60 further comprises first to third discrete intake passage portions $63_1$ to $63_3$ connected to the first flange portion 62A at the downstream ends thereof, a first junction chamber portion 64A into which the first to third discrete intake passage portions $63_1$ to $63_3$ merge at the upstream ends thereof, a first resonance passage portion 65A which extends upstream from the first junction chamber portion 64A, fourth to sixth discrete intake passage portions $63_4$ to $63_6$ connected to the second flange portion 62B at the downstream ends thereof, a second junction chamber portion 64B into which the fourth to sixth discrete intake passage portions $63_4$ to $63_6$ merge at the upstream ends thereof, a second resonance passage portion 65B which extends upstream from the second junction chamber portion 64B, and a communicating portion 66 which communicates the inner spaces in the first and second junction chamber portions 64A and 64B with each other. The upstream ends of the first and second resonance passage portions 65A and 65B merge together at an upstream side flange portion 67.

As clearly shown in FIG. 8, the first to third discrete intake passage portions $63_1$ to $63_3$ extend horizontally from the first junction chamber portion 64A to an intermediate portion and then are bent downward toward the first flange portion 62A, and the fourth to sixth discrete intake passage portions $63_4$ to $63_6$ extend horizontally along the lower surfaces of the first to third discrete intake passage portions $63_1$ to $63_3$ to an intermediate portion and then are bent downward toward the second flange portion 62B. The fourth to sixth discrete intake passage portions $63_4$ to $63_6$ extend upstream beyond the first junction chamber 64A and merge into the second junction chamber portion 64B.

A first valve casing 68 which is tubular and has an inner space extends in perpendicular to the first to third discrete intake passage portions $63_1$ to $63_3$ in the direction of the cylinder row and is connected to the lower surface of the first to third discrete intake passage portions $63_1$ to $63_3$ at their bight portions so that the inner space of the valve casing 68 communicates with the inner spaces of the first to third discrete intake passage portions $63_1$ to $63_3$. A first rotary valve 69 (which corresponds to the first on-off valve 40A in the intake system shown in FIG. 4) is fitted in the first valve casing 68 to be rotatable about its longitudinal axis. The first rotary valve 69 is provided with openings 70 at portions opposed to the first to third discrete intake passage portions $63_1$ to $63_3$. The first rotary valve 69 has a driving shaft 71 which projects through the end face of the first valve casing 68, and by rotating the driving shaft 71, the first rotary valve 69 is moved between an opening position where the openings 70 are aligned with the inner spaces of the first to third discrete intake passage portions $63_1$ to $63_3$ to communicate them each other through the inner space of the first valve casing 68 and a closed position where the openings 70 are out of alignment with the inner spaces of the first to third discrete intake passage portions $63_1$ to $63_3$ to break the communication between the first to third discrete intake passage portions $63_1$ to $63_3$.

A second valve casing 72 which is tubular and has an inner space extends in perpendicular to the fourth to sixth discrete intake passage portions $63_4$ to $63_6$ in the direction of the cylinder row and is connected to the lower surface of the fourth to sixth discrete intake passage portions $63_4$ to $63_6$ at their bight portions so that the inner space of the valve casing 72 communicates with the inner spaces of the fourth to sixth discrete intake passage portions $63_4$ to $63_6$. A second rotary valve 73 (which corresponds to the second on-off valve 40B in the intake system shown in FIG. 4) is fitted in the second valve casing 72 to be rotatable about its longitudinal axis. The second rotary valve 73 is provided with openings 74 at portions opposed to the fourth to sixth discrete intake passage portions $63_4$ to $63_6$. The second rotary valve 73 has a driving shaft 75 which projects through the end face of the second valve casing 72, and by rotating the driving shaft 75, the second rotary valve 73 is moved between an opening position where the openings 74 are aligned with the inner spaces of the fourth to sixth discrete intake passage portions $63_4$ to $63_6$ to communicate them each other through the inner space of the second valve casing 73 and a closed position where the openings 74 are out of alignment with the inner spaces of the fourth to sixth discrete intake passage portions $63_4$ to $63_6$ to break the communication between the fourth to sixth discrete intake passage portions $63_4$ to $63_6$.

The communicating portion 66 extends along the upper surface of the fifth discrete intake passage portion $63_5$ and communicates with the second junction chamber portion 64B at one end through an opening formed in the upper surface of the second junction chamber 64B and with the first junction chamber portion 64A at the other end through an opening formed in the side surface of the first junction chamber portion 64B. A butterfly valve 76 (which corresponds to the third on-off valve 40C in the intake system shown in FIG. 4) is provided in the communicating portion 66 to open and close the communicating portion 66. The butterfly valve 76 is driven by way of a driving shaft 77 which projects outside. The rotary valves 69 and 73 and the butterfly valve 76 are driven in the same manner as the first to third on-off valves 40A to 40C in the intake system shown in FIG. 4.

We claim:

1. An intake system for an engine having a plurality of cylinders which are divided into first and second cylinder groups so that the cylinders in each cylinder group do not fire one after another, said intake system comprising a plurality of discrete intake passages extending from the respective cylinders of the engine and merge into a junction chamber, a common intake passage which opens to the atmosphere at its upstream end and communicates with the junction chamber at its downstream end, a first communicating passage which is connected to the discrete intake passages for the first cylinder group at their intermediate portions and communicates them with each other, and a second communicating passage which is connected to the discrete intake passages for the second cylinder group at their intermediate portions and communicates then with each other;

wherein at least a part of said first communication passage is positioned within a cross-section of the discrete intake passages for the first cylinder group and at least a part of said second communication passage is positioned within a cross-section of the discrete intake passages for the second cylinder group so as to produce a resonance supercharging effect.

2. An intake system as defined in claim 1 in which each of said discrete intake passages extends substantially linearly.

3. An intake system as defined in claim 2 in which the cylinders in the first cylinder group are arranged in a row, the cylinders in the second cylinder group are arranged in a row substantially parallel to the cylinder row of the first cylinder group, said discrete intake passages radially extend from the junction chamber, and a midpoint between a junction of each discrete intake passage for the cylinders in the first cylinder group and the first communicating passage and a junction of each discrete intake passage for the opposed cylinders in the second cylinder group and the second communicating passage is positioned in the junction chamber.

4. An intake system as described in claim 2 in which the cylinders in the first cylinder group are arranged in a row, the cylinders in the second cylinder group are arranged in a row substantially parallel to the cylinder row of the first cylinder group, said junction chamber extends in a direction substantially parallel to the cylinder rows, said discrete intake passages extend in the transverse direction of the junction chamber so that each discrete intake passage for the cylinder in one cylinder group is substantially linearly aligned with the discrete intake passage for the opposed cylinder in the other cylinder group, and a junction of each discrete intake passage for the cylinders in the first cylinder group and the first communicating passage and a junction of each discrete intake passage for the opposed cylinders in the second cylinder group and the second communicating passage is positioned in the junction chamber.

5. An intake system as defined in claim 1, further comprising first and second control valve means for opening and closing said first and second communication passages respectively, a partition means for dividing said junction chamber into first and second junction chambers, said partition means including a third control valve means for communicating between said first and second junction chambers, wherein said first, second and third control valve means are in a closed condition when an engine speed of the engine is less than a first predetermined engine speed, said first, second and third control vale means are in an open condition when the engine speed is greater than a second predetermined engine speed and said first and second control valve means are in a closed condition and said third control valve means is in an open condition when said engine speed is greater than said first predetermined engine speed and less than said second predetermined engine speed so that a resonance supercharging effect is obtained when said engine speed is less than said first predetermined engine speed, greater than said second predetermined engine speed and between said first and second predetermined engine speeds.

* * * * *